United States Patent [19]

Noda et al.

[11] 4,144,210

[45] Mar. 13, 1979

[54] WATER-SOLUBILIZED RESIN COMPOSITION

[75] Inventors: Yuzuru Noda; Mitsuo Yoshihara; Toshio Takigawa, all of Ibaraki, Japan

[73] Assignee: Nitto Electric Industrial Co., Ltd., Ibaraki, Japan

[21] Appl. No.: 811,923

[22] Filed: Jun. 30, 1977

[30] Foreign Application Priority Data

Oct. 6, 1976 [JP] Japan ................... 51-120536

[51] Int. Cl.$^2$ .................. C08G 69/44; C08G 73/14; C08G 73/16
[52] U.S. Cl. ................... 260/29.2 N; 260/841; 260/850; 260/849; 528/229; 528/289
[58] Field of Search ..................... 260/29.2 N

[56] References Cited

U.S. PATENT DOCUMENTS

| | | | |
|---|---|---|---|
| 3,440,196 | 4/1969 | Boldebuck et al. | 260/29.2 N |
| 3,440,197 | 4/1969 | Boldebuck et al. | 260/29.2 N |
| 3,518,219 | 6/1970 | Lavin et al. | 260/29.2 N |
| 3,554,939 | 1/1971 | Lavin et al. | 260/29.2 N |
| 3,625,873 | 12/1971 | Wilson | 260/29.2 N |
| 3,925,313 | 12/1975 | Kojima et al. | 260/29.2 N |
| 4,004,062 | 1/1977 | Peterson | 260/29.2 N |
| 4,004,063 | 1/1977 | Peterson et al. | 260/29.2 N |
| 4,008,195 | 2/1977 | Ishizuka et al. | 260/29.2 N |
| 4,014,832 | 3/1977 | Suzuki et al. | 260/29.2 N |

Primary Examiner—Murray Tillman
Assistant Examiner—Arthur H. Koeckert
Attorney, Agent, or Firm—Sughrue, Rothwell, Mion, Zinn and Macpeak

[57] ABSTRACT

A water-solubilized resin composition for forming a thermally stable polyimide polymer prepared by mixing (I) a nitrogenous base salt of a polyimide precursor containing an amino group at both terminals of the molecule and having a residual acid value ratio of about 50 to about 5% obtained by reacting 1,2,3,4-butanetetracarboxylic acid and a molar excess of a diamine in water, or in a water-soluble solvent or in the presence of both a water-soluble solvent and water with (II) a nitrogenous base salt of a 3,3′,4,4′-benzophenonetetracarboxylic acid diester whose ester linkage is positioned at either one of the adjoining two carboxyl groups in the same benzene nucleus thereof.

13 Claims, No Drawings

WATER-SOLUBILIZED RESIN COMPOSITION

BACKGROUND OF THE INVENTION

1. Field of the Invention

This invention relates to a water-solubilized resin composition. More specifically, it relates to a water-solubilized resin composition which is suitable for forming by heat treatment a thermally stable polymer of a high degree of polymerization containing an aliphatic imide ring and an aromatic imide ring in the molecular chain, which can be furnished in a high concentration and with a low viscosity, and which possesses good water-solubility; and to a process for producing the composition.

2. Description of the Prior Art

Because of superior thermal stability, chemical resistance and electrical characteristics, imide-type polymers have heretofore found many applications, for example, as films, adhesives, paints and molded articles used at high temperatures. Thermally stable polyimides are obtained generally by polymerizing aromatic tetracarboxylic acid derivatives such as pyromellitic dianhydride, diethyl pyromellitate or pyromellitic acid dihalides, and diamines in organic polar solvents to form soluble high-molecular-weight polyamide acids, shaping them, and then chemically or thermally treating the shaped products to induce intramolecular cyclization.

Polyamide acids, which are polyimide precursors, readily cyclize during storage to form insoluble infusible polyimides. However, since an expensive basic solvent such as N-methyl-2-pyrrolidone, N,N-dimethylacetamide or N,N-dimethylformamide is used in a large quantity, the polymer solution itself is expensive, and a large quantity of solvent is evolved in the process of manufacturing the final products. The evolved solvent tends to pollute the air and water, and poses a problem of environmental pollution.

On the other hand, water-solubilized compositions which ultimately produce polyimide films are already known (for example, as described Japanese Patent Publication No. 38983/71 (corresponding to U.S. Pat. No. 3,663,728)). Conventional water-solubilized compositions mainly relate to water-solubilized compositions of polyamide acids which are precursors of aromatic polyimides. However, water-solubilized compositions of polyamide acids do not possess sufficient solubility, and are greatly affected by chemical changes such as hydrolysis in the subsequent imidization step and a decrease in the degree of polymerization, for example, occurs. This tends to degrade the properties of the coated film, and the films obtained have poor mechanical characteristics such as strength and elongation.

As disclosed in Japanese Patent Application (OPI) No. 76196/75 (corresponding to U.S. Pat. No. 3,925,313), a technique of water-solubilizing a polyimide precursor, which is obtained by reacting 1,2,3,4-butanetetracarboxylic acid as an acid component with a substantially equimolar amount of a diamine in the presence of a water-soluble solvent and water, by converting it to an ammonium salt, has been previously suggested. While this technique is unique, it has not yet offerred a solution to the problem of improving thermal stability and other characteristics.

SUMMARY OF THE INVENTION

After extensive investigations in order to solve the problems associated with the conventional techniques, the present invention has been developed.

The present invention provides a water-solubilized resin composition obtained by mixing (I) a water-solubilized resin solution comprising a nitrogenous base salt of a polyimide precursor containing an amino group at both terminals of the molecule and having a residual acid value ratio of about 50 to about 5%, this polyimide precursor being obtained by reacting 1,2,3,4-butanetetracarboxylic acid (hereinafter abbreviated "BTC") and a molar excess of a diamine as monomer units in water, or if desired, in a water-soluble solvent or in the presence of both a water-soluble solvent and water; and (II) a water-solubilized compound comprising a nitrogenous base salt of a 3,3',4,4'-benzophenonetetracarboxylic acid diester whose ester linkage is present at either one of the adjoining carboxyl groups in the same benzene nucleus.

DETAILED DESCRIPTION OF THE INVENTION

The water-solubilized resin solution (I) is prepared by blending 1 mole of BTC or a mixture of BTC with a minor proportion of a derivative thereof (e.g., a monoanhydride, dianhydride, ester, amide, etc.) with about 1.1 to about 2.0 moles of a diamine, subjecting the mixture to amidation and imidization to form a polyimide precursor containing an amino group at both terminals of the molecule and having a residual acid value of about 50 to about 5% in water, or if desired, in a water-soluble solvent or in the presence of both a water-soluble solvent and water, and then reacting the polyimide precursor with a nitrogenous base to form a carboxylic acid salt.

It has been found that in the reaction of BTC with a molar excess of the diamine, even if the diamine is an aromatic diamine, heating of both with stirring in the presence of water causes them to dissolve, and the amidation and the imidization proceed easily. This is believed to be a unique phenomenon which is ascribable to the fact that BTC is an aliphatic tetracarboxylic acid.

One of the important characteristics of the present invention is that the polyimide precursor containing an amino group at both terminals of the molecule and having a residual acid value ratio of about 50 to about 5% obtained by the above operation exhibits very good solubility in water as a result of reaction with a nitrogenous base.

The essential feature of the polyimide precursor, an intermediate, in accordance with this invention is that 1,2,3-4-butanetetracarboxylic acid is present as an acid component unit, and the type of the diamine is not limited in particular.

Useful diamines which can be employed include aliphatic, alicyclic, aromatic or heterocyclic diamines of the formula

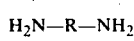

wherein R is a divalent organic group, or mixtures thereof. Aromatic diamines are commercially suitable.

Specific examples of suitable diamines include aromatic diamines such as m-phenylenediamine, p-phenylenediamine, 4,4'-diaminodiphenylmethane, 4,4'- diaminodiphenylethane, 4,4'-diaminodiphenylpropane, 4,4'-diaminodiphenylether, 3,4'-diaminodiphenylether, benzidine, 3,3'-dimethoxybenzidine, 4,4'-diaminodiphenyl sulfide, 4,4'-diaminodiphenyl sulfone, 3,3'-diaminodiphenyl sulfone, p-bis(4-aminophenoxy)benzene, m-bis(4-aminophenoxy)benzene, 4,4'-diaminobiphenyl, m-xylylenediamine, p-xylylenediamine, and bis(4-aminophenyl)phosphine oxide, aliphatic diamines such as hexamethylenediamine, heptamethylenediamine, octamethylenediamine, nonamethylenediamine, 4,4-dimethylheptadiamine, 3-methoxyheptamethylenediamine, 2,11-diaminododecane, 2,2'-diaminodiethylether, 2,2'-diaminodiethylthioether and 3,3'-diaminodipropoxyethane, alicyclic diamines such as di(p-amino-cyclohexyl)methane and 1,4-diaminocyclohexane, and heterocyclic diamines such as 2,6-diaminopyridine, guanamine, 2,5-diamino-1,3,4-oxadiazole and 2-(3'-aminophenyl)-5-aminobenzoxazole and other diamines such as bis(4-aminophenyl)diethylsilane.

These diamines are used either individually or as mixtures thereof.

Examples of water-soluble solvents which can be used in this invention include compounds expressed by the following general formulae:

monohydric alcohols of the formula (a)

            (a)

$R_1$—OH wherein $R_1$ is a monovalent residue of an aliphatic or alicyclic compound having 3 to 8 carbon atoms;

glycols of the following formula (b)

HO—$R_2$—OH           (b)

wherein $R_2$ is a divalent residue of an aliphatic or alicyclic compound having 3 to 8 carbon atoms, or a divalent residue of the formula

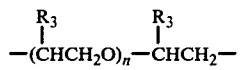

$$-(\underset{|}{\overset{R_3}{C}}HCH_2O)_n-\underset{|}{\overset{R_3}{C}}HCH_2-$$

in which $R_3$ is a hydrogen atom or a methyl group, and n is an integer of 0 to 5;

glycol ethers of the formula (c)

$R_4O$—$(CH_2CH_2O)_m$—H       (c)

wherein m is an integer of 1 to 3 and $R_4$ is a lower alkyl group having 1 to 4 carbon atoms; and trihydric alcohols expressed by the following formula (d)

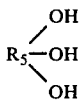

$$R_5 \begin{matrix} \nearrow OH \\ -OH \\ \searrow OH \end{matrix} \qquad (d)$$

wherein $R_5$ is a residue of glycerin or trimethylolpropane.

Examples of suitable compounds of the formula (a) are isopropyl alcohol, n-butyl alcohol, t-butyl alcohol, n-amyl alcohol, hexyl alcohol, heptyl alcohol, octyl alcohol, cyclopentanol and cyclohexanol. Examples of suitable compounds of the formula (b) are ethylene glycol, diethylene glycol, triethylene glycol, tetraethylene glycol, other liquid low-molecular-weight polyethylene glycols, propylene glycol, dipropylene glycol, 1,4-butanediol, 1,6-hexanediol, and 1,4-cyclohexanediol. Examples of suitable compounds of the formula (c) include ethylene glycol monoalkyl (monomethyl, monoethyl, monoisopropyl or monobutyl) ethers, diethylene glycol monoalkyl (monomethyl, monoethyl, monoisopropyl or monobutyl) ethers, and triethylene glycol monomethyl ether. Examples of compounds of the formula (d) are glycerin and trimethylolpropane. These water soluble solvents can be used either individually or as mixtures thereof.

In addition to the above-described compounds of the formulae (a)–(d), basic organic solvents such as N-methyl-2-pyrrolidone, N,N-dimethylformamide and N,N-dimethylacetamide can be used as the water soluble solvent in this invention. These basic organic solvents can be used either individually or in admixture with one or more of the compounds of the formulae (a)–(d).

The preferred amount of the diamine to be reacted with BTC is in the range of about 1.1 moles to about 2.0 moles per mole of BTC. If the amount of the diamine is too small in the above reaction, the viscosity of the desired water-solubilized resin solution [I] increases, and the reactivity of water-solubilized resin solution [I] with the water-solubilized compound [II] tends to become poor. If the amount of the diamine is too large, unreacted diamine remains in the reaction system. When the diamine is an aromatic diamine, the use of an excessive amount of the diamine tends to cause the water-solubilized resin solution [I] to be cloudy and translucent.

In the reaction of BTC with the diamine, water or a water-soluble solvent can be used individually, but conducting the reaction in the presence of both water and a water-soluble solvent is sometimes very effective from an operational standpoint. The amidation reaction and partial imidization reaction are performed while discharging a part of the water from the reaction system, or without discharging water, as the temperature is increased. The concentration, i.e., the amount of the diamine plus the BTC, of the reaction system is not limited in particular. But preferably, a suitable concentration is about 50 to about 95% by weight. If the concentration is too high, the operation becomes difficult due to an increase in the viscosity at the time of the reaction. On the other hand, if the concentration is too low, the rate of reaction becomes slow. A suitable reaction temperature is at least about 60° C. and up to the boiling point of the polymerization system at atmospheric pressure, preferably from 80° C. to the boiling point of the polymerization system.

The above-described reaction provides a relatively low-molecular-weight polyimide precursor containing an amino group at both terminals of the molecule and having a residual acid value ratio of about 50 to about 5%.

The acid value is the milligram equivalents of carboxyl groups per gram of sample. The term "residual acid value ratio", as used in the present specification, denotes the percentage of acid groups remaining after the reaction based on the acid value of the carboxylic acid component in the reaction system at the initial stage of the reaction. When the reaction is performed in water or in the presence of both a water-soluble solvent and water, the product distilled out of the reaction system during the reaction is returned to the reaction system, and the residual acid value of the product at this time is expressed as the percentage of its acid value based on the acid value of the system at the initial stage of the reaction.

The polyimide precursor has a residual acid value ratio of about 50 to about 5%. If the residual acid value ratio is less than about 5%, it is difficult to obtain a uniform water-solubilized resin solution at the time of water-solubilizing the precursor. On the other hand, if the residual acid value is above about 50%, there is a possibility of an incomplete reaction of the starting BTC with the diamine. Thus, residual acid values outside the range specified above are undesirable.

The polyimide precursor is then reacted with a nitrogenous base to form a salt and thereby water-solubilize the polyimide precursor. The nitrogenous base is a nitrogen compound which acts as a base and examples include ammonia, a primary, secondary or tertiary amine, a heterocyclic compound which acts like a tertiary amine, and a quaternary ammonium compound. Specific examples of nitrogenous compounds include gaseous ammonia, aqueous ammonia, trimethylamine, triethylamine, dimethylaniline, diethylaniline, triphenylamine, n-methylmorpholine, n-ethylmorpholine, pyridine, methylamine, ethylamine, dimethylamine, diethylamine, N,N-dimethylethanolamine, triethanolamine, tetramethyl ammonium hydroxide. The amount of the nitrogenous compound is desirably an about equivalent amount to the residual carboxyl groups of the polyimide precursor.

The use of ammonia and aqueous ammonia is especially preferred since even when they are added in excess, the excess beyond the equivalent amount is released, and does not remain in the reaction system.

A suitable temperature at which the polyimide precursor can be converted to the salt is about 0° to about 200° C., and temperatures of 40° to 120° C. are preferred. Thus, the water-solubilized resin solution [I] can be obtained easily.

The water-solubilized compound [II] which results in the production of a high-molecular-weight thermally stable polymer on reaction with the terminal amino groups of the water-solubilized resin solution [I] is a derivative of a 3,3',4,4'-benzophenonetetracarboxylic acid diester (hereinafter abbreviated "BTDE").

BTDE is a diester in which each ester linkage is positioned at either one of the two carboxyl groups present in the same benzene nucleus, that is, one of the two ester linkages is positioned at the 3-position or the 4-position of the benzophenone nucleus and the other ester linkage is positioned at the 3'-position or the 4'-position of the benzophenone nucleus. Thus, the BTDE to be used in the present invention is a 3,3'-diester, a 3,4'-diester or a 4,4'-diester of 3,3',4,4'-benzophenonetetracarboxylic acid or a mixture thereof. The BTDE can be easily obtained by esterifying 3,3',4,4'-benzophenonetetracarboxylic dianhydride with a mono-, di- or tri-hydric alcohol to obtain a mixture of the isomers. Compounds corresponding to the formulae (a), (b) and (d) exemplified hereinabove with regard to the water-soluble solvent are useful as mono-, di- or tri-hydric alcohols suitable for esterification. BTDE is water-solubilized by reacting the residual carboxyl groups thereof with a nitrogenous base to form a salt. Examples of suitable nitrogenous bases and appropriate reaction conditions therefor are the same as those described hereinabove with regard to the water-solubilization of the polyimide precursor.

The nitrogenous base salt of BTDE used in the present invention is characterized by the position of the ester linkage. Moreover, it can be more easily water-solubilized than similar salts derived from other aromatic tetracarboxylic acids such as pyromellitic acid, and at the time of heat treatment for obtaining the final desired product, polymerization by the imidization reaction with the water-solubilized resin solution [I] proceeds smoothly. This leads to the formation of thermally stable polymers having superior thermal stability, chemical resistance and electrical characteristics and especially good flexibility.

The water-solubilized resin composition of this invention is obtained by mixing the water-solubilized resin solution [I] and the water-solubilized compound [II] derived from BTDE, each of which is obtained by the procedures described hereinabove.

They are generally mixed so that the terminal amino groups of [I] and the carboxyl group derivative of [II] are present in substantially equal stoichiometric amounts. It is permissible however for either one of them to be present in an excess up to about 30 equivalent %.

There is no particular restriction on the concentration of the resin solids in the water-solubilized resin composition in accordance with this invention. Usually, the resin solids concentration is about 10 to 70% by weight. In actual processing, the composition of this invention is diluted, e.g., with water or a water-soluble solvent, to a concentration easy to handle, and then processed.

If desired, other water-soluble resins may be incorporated into the water-solubilized resin composition of the present invention depending upon the end use, e.g., urea, water-soluble condensates between melanine or phenols with aldehydes or the esterified products thereof, water-soluble compounds, for example, water-soluble titanium compounds, e.g., dihydroxy bis(hydrogen lactato)titanium and the ammonium salts thereof, and water-soluble zirconium compounds and the like. These optional resins can be used in an amount less than about 10, usually about 0.1 to 5, % by weight based on the weight of the resin content of the composition.

In addition, organic metal salts such as tin, zinc, manganese, iron, cobalt, lead or a like salt of octenoic acid or naphthenic acid which are not water-soluble in nature but are useful as a reaction accelerator for the reaction between the water-solubilized resin [I] and the water-solubilized compound [II] can be also mixed with the composition prior to processing as long as the amount used is in the range of from about 0.01 to 0.1% by weight.

The following examples are given to illustrate the present invention in greater detail. Unless otherwise indicated, all parts, percents, ratios and the like are by weight.

EXAMPLE 1

A 500 cc three-necked flask equipped with a thermometer, a trap-fitted condenser and a stirrer was charged with 81.9 g (0.35 mole) of 1,2,3,4-butanetetracarboxylic acid (BTC), 99.0 g (0.5 mole) of 4,4'-diaminodiphenylmethane and 200 g of purified water, and the contents were heated with stirring. At about 90° C., a uniform solution was formed. At around 100° C., the distillation of water began, and in about 1 hour, 125 g of the initially charged water and the water formed as a result of reaction distilled out, whereupon the temperature of the reaction system reached 130° C. At this time, the reaction was stopped to afford a polyimide precursor containing an amino group at both terminals of the molecule and having a residual acid value ratio of 47.5%. Then, 28% ammonia aqueous was added dropwise at a flask temperature of 80° to 100° C. to form the ammonium salt and thereby a water-solubilized resin solution was obtained.

Then, 62.1 g (0.15 mole) of di(ethyl alcohol) ester of 3,3',4,4'-benzophenonetetracarboxylic acid was water-solubilized by adding 28% aqueous ammonia at 90° C. The resulting water-solubilized compound was mixed with the water-solubilized resin solution set forth above, and the mixture was diluted with purified water to form an aqueous solution having a viscosity of 2 poises (30° C.).

A glass cloth (plain weave; thickness 0.18 mm) was impregnated with the resulting aqueous solution to a solids content of 40%. Water was evaporated off at 100° C., and the impregnated cloth was dried further at 150° C. for 2 hours to form a prepreg. Seven such prepregs were superposed, and held between presses preheated at 300° C. and heated for about 10 minutes under a light pressure. Then, they were pressed for 10 minutes under a pressure of 150 kg/cm$^2$ to form a laminate.

The characteristics of the resulting laminate were measured, and the results obtained are shown below.

| | | |
|---|---|---|
| Tensile Strength | (20° C.) | 30 kg/mm$^2$ |
| Flexural Strength | (20° C.) | 60–65 kg/mm$^2$ |
| Flexural Strength | (200° C.) | 48–50 kg/mm$^2$ |
| Insulation Resistance | (initial stage) | 2 × 10$^{14}$ ohms |
| Insulation Resistance | (D-4/100)* | 3 × 10$^{13}$ ohms |
| Volume Resistivity | | 2 × 10$^{15}$ ohms-cm |
| Dielectric Constant | (1 KHz) | 4.0 |
| Dielectric Loss Tangent | (1 KHz) | 0.3 |
| Water Absorption | (D-24/23)* | 0.12% |
| Thermal Stability Test | (E-24/180)* | Acceptable |
| Heat Loss | (250° C. × 10 days) | 1.0% |

Note: *represents numbers of ASTM.

EXAMPLE 2

The same type of flask as was used in Example 1 was charged with 58.5 g (0.25 mole) of BTC, 99.0 g (0.5 mole) of 4,4'-diaminodiphenylmethane, 70 g of triethylene glycol and 100 g of purified water, and the mixture were heated with stirring.

Distillation of water began at about 100° C. The reaction system gradually became uniform and turned dark brown. On further heating, the temperature of the reaction system increased, and its viscosity rose. About 1 hour after the beginning of the distillation of water, the temperature of the reaction system had reached 130° C. When the reaction was stopped at this point, the amount of water distilled out was 36 cc, and a polyimide precursor containing an amino group at both terminals of the molecule and having a residual acid value ratio of 17.0% was obtained.

Then, 100 g of 28% aqueous ammonia was added dropwise at a flask temperature of 80° to 100° C. to form the ammonium salt of the polyimide precursor. In the above reaction, the excess of ammonia volatilized away from the reaction system after the formation of the salt, and the resulting water-solubilized resin solution was substantially free from an ammonia odor.

On the other hand, 155 g (0.25 mole) of di(triethylene glycol) ester of 3,3',4,4'-benzophenonetetracarboxylic acid was water-solubilized by adding 28% aqueous ammonia at 50° C. The resulting water-solubilized compound was added to the water-solubilized resin solution produced as described above.

The resulting water-solubilized resin composition was diluted with purified water to form a wire enamel having a viscosity of 10 poises (30° C.) and a solids content of 60.3% (after drying at 200° C. for 2 hours). A copper wire with a core diameter of 1.0 mm was coated with the resulting wire enamel and the coating was baked at a temperature of 450° C. and at a rate of 5.0 m/min. in a vertical-type furnace having a furnace length of 3.0 m. This coating and baking cycle was repeated six times. The characteristics of the enamelled wire were determined, and the results obtained are shown below.

| | | |
|---|---|---|
| Thickness of Coated Film | | 0.040 mm |
| Flexibility Self-Diameter Winding | (after 10% stretch) | Good |
| | (after 15% stretch) | Good |
| | (after 20% stretch) | Good |
| Heat Softening Temperature | (2 Kg load) | 490° C. |
| Reciprocating Abrasion Resistance | (600 g load) | 130 times |
| Slit Twist | (20 cm span) | 93 counts |
| Dielectric Breakdown Voltage | (normal conditions) | 12.1 KV |
| Dielectric Breakdown Voltage after Heat Deterioration (after heating at 260° C. for 168 hours) | | 11.1 KV |
| Burn-Out Property 42A 20 seconds ON, 10 seconds OFF | (120 V) | 136 cycles |

COMPARATIVE EXAMPLE 1

The same type of flask as was used in Example 1 was charged with 117.0 g (0.5 mole) of BTC, 99.0 g (0.5 mole) of 4,4'-diaminodiphenylmethane, 70 g of triethylene glycol and 100 g of purified water, and the mixture was heated with stirring. Distillation of water began at about 100° C., and when the reaction was continued for about 1 hour, the temperature of the reaction system reached 130° C. When the reaction was stopped at this point, the amount of water distilled out was 45 cc, and a high-molecular-weight polyimide precursor having a residual acid value ratio of 22.0% was obtained. The polyimide precursor was water-solubilized by adding dropwise 28% aqueous ammonia at 80° to 100° C. The water-solubilized resin solution obtained was further diluted with purified water to produce a wire enamel having a viscosity of 9.4 poises (30° C.) and a solids content of 45.4% (after drying at 200° C. for 2 hours).

A copper wire was coated with the resulting enamel, and the coating was baked, using the same procedures as in Example 2. The characteristics of the enamelled wire were determined, and the results obtained are shown below for comparison with those of the enamelled wire in Example 2.

| | | |
|---|---|---|
| Thickness of Coated Film | | 0.040 mm |
| Flexibility Self-Diameter Winding | (after 10% stretch) | Good |
| | (after 15% stretch) | Good |
| | (after 20% stretch) | Poor |
| Heat Softening Temperature | (2 Kg load) | 415° C. |
| Reciprocating Abrasion Resistance | (600 g load | 72 times |
| Slit Twist | (20 cm span) | 80 counts |
| Dielectric Breakdown Voltage | (normal conditions) | 11.3 KV |
| Dielectric Breakdown Voltage after Heat Deterioration | | 8.8 KV |

-continued

| (after heating at 260°0 C. for 168 hours) Burn-Out Property 42A seconds ON, 10 seconds OFF | (120 V) | 83 cycles |
|---|---|---|

| Film Thickness | | 50 μ |
|---|---|---|
| Tensile Strength | (ASTM 882-61T) | 15.1 kg/cm$^2$ |
| Elongation | (ASTM 882-61T) | 25% |
| Dielectric Constant | (1 KHz, 20° C.) | 3.2 |
| Dielectric Loss Tangent | (1 KHz, 20° C.) | 0.002 |

EXAMPLE 3

The same type of flask as was used in Example 1 was charged with 81.9 g (0.35 mole) of BTC, 99.0 g (0.5 mole) of 4,4'-diaminodiphenylmethane, 35 g of ethylene glycol and 100 g of purified water, and the mixture was heated with stirring. Distillation of water began at about 100° C., and by about 2 hours later, the water initially charged and the water resulting from the reaction had distilled out in an amount of 108 cc, and the temperature of the reaction system reached 130° C. At this point, the reaction was stopped to produce a polyimide precursor containing an amino group at both terminals of the molecule and having a residual acid value ratio of 20.2%. The resulting polyimide precursor was reacted with 28% aqueous ammonia to form the ammonium salt thereof and thereby obtain a water-solubilized resin solution.

Then, 28% aqueous ammonia was added at 90° C. to 62.1 g (0.15 mole) of di(ethyl alcohol) ester of 3,3',4,4'-benzophenonetetracarboxylic acid to water-solubilize the ester. The resulting water-solubilized product was mixed with the above water-solubilized resin solution. The mixture was diluted with purified water to produce a wire enamel having a viscosity of 32 poises (30° C.) and a solids content of 47% (after drying at 200° C. for 2 hours). The wire enamel was coated and baked using the same procedures as in Example 2. The characteristics of the resulting enamelled wire were substantially the same as those of the enamelled wire produced in Example 2.

EXAMPLE 4

The same type of flask as was used in Example 1 was charged with 93.6 g (0.40 mole) of BTC, 99.0 g (0.5 mole) of 4,4'-diaminodiphenylmethane and 70 g of glycerin, and the mixture was heated with stirring. The reaction was continued in the same manner as in Example 1, and stopped when the temperature of the reaction system reached 130° C. The water resulting from the reaction was distilled out in an amount of 12 cc, and a polyimide precursor containing an amino group at both terminals of the molecule and having a residual acid value ratio of 22.4% was obtained. Triethylamine (50 g) was added to the resulting solution to form the triethylamine salt thereof and thus a water-solubilized resin solution.

Then, 30 g of triethylamine was added at 60° C. to 88.5 g (0.15 mole) of di(diethyglycol monoether)ester of benzophenonetetracarboxylic acid to water-solubilize the ester. The resulting water-solubilized compound was mixed with the above water-solubilized resin solution. The mixture was diluted with purified water to produce a coating agent having a viscosity of 98 poises (30° C.) and a solids content of 61% (after drying at 200° C. for 2 hours).

The coating agent was cast on a heat-resistant glass sheet using a knife coater, and dried in a hot air dryer at 80° C. for 2 hours, at 130° C. for 1 hour, and finally at 270° C. for 1 hour. The resulting film was found to have the following characteristics.

While the invention has been described in detail and with reference to specific embodiments thereof, it will be apparent to one skilled in the art that various changes and modifications can be made therein without departing from the spirit and scope thereof.

What is claimed is:

1. A water-solubilized resin composition obtained by mixing
    a water-solubilized resin solution comprising a volatile nitrogenous base salt of a polyimide precursor containing an amino group at both terminals of the molecule and having a residual acid value ratio of about 50 to about 5%, said polyimide precursor being obtained by reacting 1,2,3,4-butanetetracarboxylic acid and a molar excess of a diamine as monomer units in water, in a water-soluble solvent or in both a water-soluble solvent and water; with
    a water-solubilized compound comprising a volatile nitrogenous base salt of a 3,3'-diester, a 3,4'-diester or a 4,4'-diester of a 3,3', 4,4'-benzophenonetetracarboxylic acid.

2. The composition of claim 1, wherein the molar ratio of the 1,2,3,4-butanetetracarboxylic acid to the diamine reacted to form the polyimide precursor is about 1:1.1 to about 1:2.0.

3. The composition of claim 2, wherein the diamine is an aromatic primary diamine.

4. The composition of claim 1, wherein the water-soluble solvent is at least one compound selected from the group consisting of a monohydric alcohol, a glycol, a glycol ether, and a trihydric alcohol.

5. The composition of claim 1, wherein the water-solubilized compound [II] is present in an amount which is substantially equivalent stoichiometrically to the water-solubilized resin solution [I].

6. The composition of claim 1, wherein said polyimide precursor is obtained by reacting said 1,2,3,4-butanetetracarboxylic acid with said diamine at a temperature of at least about 60° C. and up to the boiling point of the polymerization system at atmospheric pressure.

7. The composition of claim 6, wherein said reaction is carried out in a total concentration of the said diamine plus said 1,2,3,4-butanetetracarboxylic acid of about 50 to 95% by weight.

8. The composition of claim 1, wherein said volatile nitrogenous base used to form the nitrogenous base salt of the polyimide precursor and the nitrogenous base salt of the 3,3',4,4'-benzophenonetetracarboxylic acid diester is ammonia, a primary amine, a secondary amine, a tertiary amine, a heterocyclic compound which acts as a tertiary amine or a quaternary ammonium compound.

9. The composition of claim 1, wherein said nitrogenous base salt of the polyimide precursor is obtained by reacting said nitrogenous base with said polyimide precursor at a temperature of about 0° to about 200° C.

10. The composition of claim 1, wherein said water-soluble solvent is a compound represented by the general formula (a)

$$R_1-OH \qquad (a)$$

wherein $R_1$ represents a monovalent residue of an aliphatic or alicyclic compound having 3 to 8 carbon atoms; the general formula (b)

$$HO-R_2-OH \qquad (b)$$

wherein $R_2$ represents (1) a divalent residue of an aliphatic or alicyclic compound having 3 to 8 carbon atoms or (2) a divalent residue of the formula $$-\overset{R_3}{\underset{|}{C}}HCH_2O)_n-\overset{R_3}{\underset{|}{C}}HCH_2-$$

in which $R_3$ is a hydrogen atom or a methyl group and n is an integer of 0 to 5; the general formula (c)

$$R_4O-(CH_2CH_2O)_m-H \qquad (c)$$

wherein $R_4$ represents a lower alkyl group having 1 to 4 carbon atoms and m is an integer of 1 to 3; or the general formula (d)

$$R_5\begin{matrix}-OH\\-OH\\-OH\end{matrix} \qquad (d)$$

wherein $R_5$ represents a residue of glycerin or trimethylolpropane.

11. The composition of claim 1, wherein said 3,3',4,4'-benzophenonetetracarboxylic acid diester is obtained by esterifying 3,3',4,4'-benzophenonetetracarboxylic dianhydride with a mono-, di- or tri-hydric alcohol represented by the general formula (a)

$$R_1-OH \qquad (a)$$

wherein $R_1$ represents a monovalent residue of an aliphatic or alicyclic compound having 3 to 8 carbon atoms; the general formula (b)

$$HO-R_2-OH \qquad (b)$$

wherein $R_2$ represents (1) diavalent residue of an aliphatic or alicyclic compound having 3 to 8 carbon atoms or (2) a divalent residue of the formula $$-\overset{R_3}{\underset{|}{C}}HCH_2O)_n-\overset{R_3}{\underset{|}{C}}HCH_2-$$

in which $R_3$ is a hydrogen atom or a methy group and n is an integer of 0 to 5; the general formula (c)

$$R_4O-(CH_2CH_2O)_m-H \qquad (c)$$

wherein $R_4$ represents a lower alkyl group having 1 to 4 carbon atoms and m is an integer of 1 to 3; or the general formula (d)

$$R_5\begin{matrix}-OH\\-OH\\-OH\end{matrix} \qquad (d)$$

wherein $R_5$ represents a residue of glycerin or trimethylolpropane.

12. The composition of claim 1, wherein said nitrogenous base salt of said 3,3',4,4'-benzophenonetetracarboxylic acid diester is obtained by reacting 3,3',4,4'-benzophenonetetracarboxylic acid diester with a nitrogenous base compound selected from the group consisting of ammonia, a primary amine, a secondary amine, a tertiary amine, a heterocyclic compound which acts as a tertiary amine and a quaternary ammonium compound.

13. The composition of claim 1, wherein either said water-solubilized resin solution [I] and said water-solubilized compound [II] are present in an amount of from a substantially equivalent amount to each other or one of said water-solubilized resin solution [I] or said water-solubilized compound [II] is present up to about 30 equivalent % excess of the other.

* * * * *